United States Patent [19]

Ganser et al.

[11] Patent Number: 4,994,716
[45] Date of Patent: Feb. 19, 1991

[54] CIRCUIT ARRANGEMENT FOR STARTING AND OPERATING GAS DISCHARGE LAMPS

[75] Inventors: Hans-Günther Ganser, Stolberg; Ralf Schäfer, Aachen; Hans-Peter Stormberg, Stolberg, all of Fed. Rep. of Germany

[73] Assignee: U.S. Philips Corporation, New York, N.Y.

[21] Appl. No.: 900,191

[22] Filed: Aug. 25, 1986

[30] Foreign Application Priority Data

Aug. 28, 1985 [DE] Fed. Rep. of Germany ....... 3530638

[51] Int. Cl.⁵ ............................................. H05B 37/00
[52] U.S. Cl. .................................. 315/200 R; 315/291; 315/DIG. 4; 315/DIG. 7; 315/241 R
[58] Field of Search ..................... 315/175, 176, 200 R, 315/173, 291, 310, DIG. 5, 4, DIG. 7, 274, 128, 159, 360, 241 R

[56] References Cited

U.S. PATENT DOCUMENTS

| | | | |
|---|---|---|---|
| 3,878,429 | 4/1975 | Iwata | 315/241 R |
| 3,896,333 | 7/1975 | Nakamura | 315/241 R |
| 4,194,143 | 3/1980 | Farkas et al. | 315/241 R |
| 4,316,124 | 2/1982 | Verwimp et al. | 315/241 R |
| 4,447,759 | 5/1984 | Moerkens et al. | 315/241 R |
| 4,520,295 | 5/1985 | Bolhuis | 315/291 |
| 4,539,513 | 9/1985 | Ganser et al. | 315/200 R |
| 4,663,569 | 5/1987 | Alley et al. | 315/175 |

FOREIGN PATENT DOCUMENTS 2074801 11/1981 Japan .
1528033 10/1978 United Kingdom .

Primary Examiner—Michael Razavi
Attorney, Agent, or Firm—Bernard Franzblau

[57] ABSTRACT

A circuit arrangement for starting and operating gas discharge lamps with current of higher frequency comprises an electronic ballast unit connected to a direct voltage input source (2). An electronic switching element (3), which is controlled by a control device (8), is connected in series with an inductive element (4), and the discharge lamp (5). The lamp current flows through the inductive element from which a voltage is derived which is supplied to the control device as a supply direct voltage supply via a rectifier (14) and a smoothing capacitor (16). A first connection terminal of the smoothing capacitor is connected through a first ohmic resistor (18) to a first terminal of the direct voltage input source and a second connection of the capacitor is connected through the lamp (5) to a second terminal of the direct voltage input source.

22 Claims, 1 Drawing Sheet

CIRCUIT ARRANGEMENT FOR STARTING AND OPERATING GAS DISCHARGE LAMPS

BACKGROUND OF THE INVENTION

This invention relates to a circuit arrangement for starting and operating a gas discharge lamp with a current of higher frequency, and provided with an electronic ballast unit which is to be connected to an input d.c. voltage source and comprises an electronic switching element which is controlled by a control device and is connected in series with an inductive element which is acted upon by the lamp current and from which a voltage can be derived, which is fed as a d.c. supply voltage to the control device through a rectifier and a smoothing capacitor. A current of higher frequency is to be understood to mean an alternating current having a frequency between 10 and 500 kHz, preferably between 20 and 150 kHz.

Circuit arrangements of this kind are described in DE OS 25 46 760 and DE OS 31 11 561. There the d.c. supply voltage is produced by means of a tapping or a secondary winding of an inductive element which is already a part of the electronic ballast unit. However, when the d.c. supply voltage is produced in this manner, the electronic switching element can be switched at higher frequency in general only if a d.c. present. For this reason, in the known circuit arrangements, a starting circuit is used which ensures that the control electrode of the electronic switching element is acted upon &from the rectified mains voltage through resistors or diodes and capacitors by a d.c. supply voltage, which initiates the step of switching the electronic switching element at higher frequency. This has the disadvantage that additional elements are required, which otherwise do not fulfill any function and in which moreover losses occur. Besides, especially in circuit arrangements having an electronic control device for current limitation, the problem can arise that at the instant at which the electronic switching element is switched on through the starting circuit the control device has not yet been sufficiently supplied with voltage. Consequently, the current limitation function of the control device may not yet be in operation so that the switching element can be destroyed by excess currents.

For this reason, it is known from EU-OS 00 59 053 to charge directly the smoothing capacitor with the d.c. supply voltage through a starting circuit in the form of a thyristor, as a result of which the electronic switching elements are not switched on until the control device is also operative. Also in this case, additional elements are required, which otherwise do not fulfil any function.

SUMMARY OF THE INVENTION

Therefore, an object of the invention is to provide, in a circuit arrangement for starting and operating gas discharge lamps comprising an electronic ballast unit, a d.c. voltage supply for its control device, which is constructed as simply as possible and so as to be loss-free and which may be combined with other necessary functions of the ballast unit. Furthermore, the circuit arrangement should provide a reliable start even with lamps igniting only with difficulty.

According to the invention, this object is achieved in a circuit arrangement of the kind mentioned in the opening paragraph in that the first connection (terminal) of the smoothing capacitor is connected through a first ohmic resistor to a first terminal of the input direct voltage source and its second connection (terminal) is connected through the lamp to a second terminal of the input direct voltage source.

By this circuit arrangement, it is achieved that, during the starting process, the lamp can be traversed, via a current circuit comprising the smoothing capacitor and the first ohmic resistor, by an additional current for normal current flow through the actual electronic ballast unit. This current facilitates the ignition of the lamp, more particularly the ignition of a still hot lamp, and at the same time charges the smoothing capacitor to the d.c. voltage level required for driving the switching element.

Preferably, a voltage-stabilizing element, more particularly a Zener diode, is connected parallel to the smoothing capacitor.

The ohmic resistor connected in series with the smoothing capacitor limits the additional flow of current through the lamp. It may be advantageous that a controllable semiconductor switch is connected in series with the first ohmic resistor and the smoothing capacitor. The controllable semiconductor switch serves to interrupt the current through the first ohmic resistor after the lamp has started. Thus, losses in the first ohmic resistor are avoided.

In a first embodiment, the controllable semiconductor switch is a first switching transistor. This switching transistor can be switched on and off in a simple manner in that its collector-base path is shunted by a second ohmic resistor and its emitter-base path is shunted by a second switching transistor, whose base is connected to the end facing the rectifier of a current-limiting resistor arranged between the rectifier and the smoothing capacitor. Thus, when current flows from the inductive element through the rectifier and the current-limiting resistor to the smoothing capacitor, the second switching transistor becomes conductive due to the voltage drop at the current-limiting resistor. As a result, the first switching transistor again becomes high-ohmic and thus interrupts the additional flow of current.

In order to guarantee that the additional current flow is switched off in a defined manner only at a d.c. supply voltage sufficiently high for the control device, it is efficient to connect, between the current-limiting resistor and the base of the second switching transistor, a voltage-dependent threshold element, for example a Zener diode, a diac or a sidac, as a result of which the second switching transistor becomes conductive only when the voltage drop exceeds the threshold voltage of the threshold element.

Furthermore, the starting behaviour of the lamp may be improved if the additional flow of current is still maintained for some time after the starting operation. This can be achieved in that an RC combination is connected to the current-limiting resistor and to the base of the second switching transistor so that its base voltage can increase only with delay.

In the case of lamps that are difficult to ignite, it may occur that a very high additional flow of current is necessary for a reliable start. In this case, the required first switching transistor must be comparatively large and expensive. Therefore, it is advantageous to use instead of the first switching transistor a less expensive and smaller transistor or triac as the controllable semiconductor switch for interrupting the additional flow of current. The thyristor (triac) can then be switched on and off in a simple manner by a circuit arrangement in which the series-combination comprising the thyristor or triac and the smoothing capacitor is shunted by a voltage divider which comprises two subresistors and of which the junction point of the two subresistors is connected through a voltagedependent threshold element to the control electrode of the thyristor or triac. The voltage-dependent threshold element again may be a Zener diode, a diac or a sidac. This circuit arrangement affords the advantage that an ignition of the thyristor or triac takes place already when the smoothing capacitor has not yet been charged and the ignition of the thyristor or triac is automatically interrupted when the voltage at the smoothing capacitor reaches a given value.

An improved ignition of the thyristor or triac and hence smaller transition losses can thus be attained, if a further capacitor is connected between the voltage-dependent threshold element and the connection of the smoothing capacitor remote from the thyristor or triac.

It may further be favourable to connect an anti-interference capacitor between the cathode and the control electrode of the thyristor or triac. High-frequency interferences is then reduced so that an unintentional ignition is avoided.

In the case of gas discharge lamps that can be ignited only with difficulty, an ignition circuit comprising elements supplying an ignition pulse to the lamp or its external ignition electrode can be connected parallel to the lamp. At the same time, these elements permit, when the lamp is not yet ionized, a flow of current for charging the smoothing capacitor.

With the use of thyristors (triacs), a problem can occur in that a synchronization between the ignition of the thyristor (triac) and the ionization of the lamp by a lamp ignition circuit need not exist. Therefore, it may occur that upon ionization of the lamp, the thyristor has already become non-conductive again because a sufficient flow of current was not possible through the lamp not yet ionized. According to a further embodiment of the invention, this can be avoided in that by means of a third ohmic resistor, a further current path parallel to the lamp is formed, which permits that, even when the lamp is not ionized, a current to flow through the thyristor (triac) which lies above its hold current. Thus, the thyristor (triac) remains conducting until the lamp is ionized; the actual additional current can then flow through the thyristor (triac) and the lamp and consequently can ensure a reliable ignition of the lamp.

BRIEF DESCRIPTION OF THE DRAWING

In order that the invention may be readily carried into effect, it will now be described more fully, by way of example, with reference to the accompanying drawing, in which.

DESCRIPTION OF THE PREFERRED EMBODIMENTS

Figure 1:
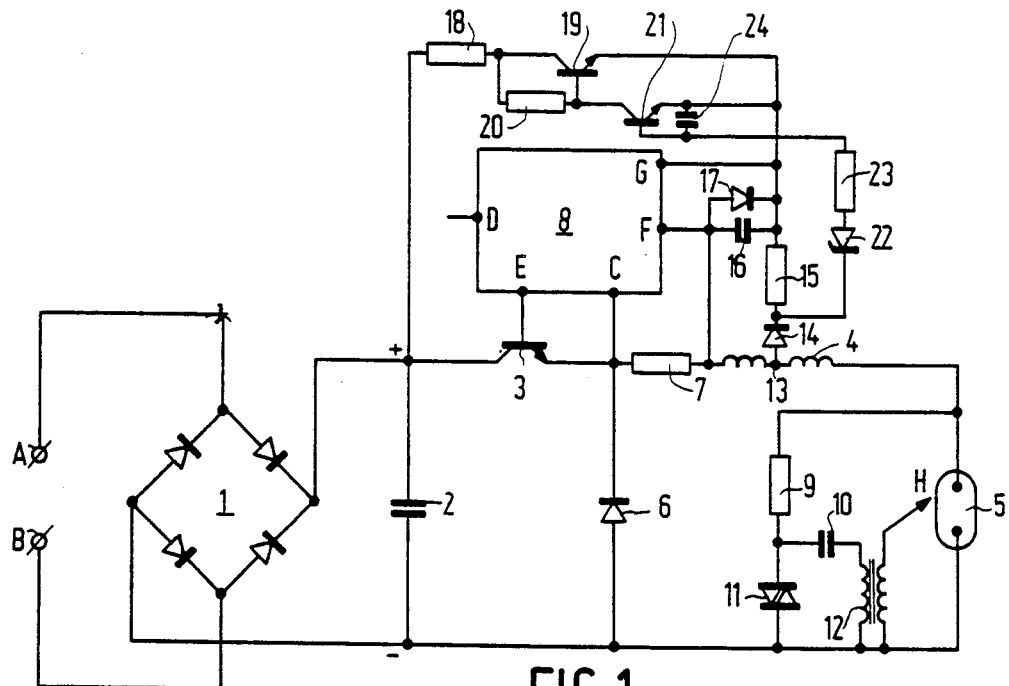
FIG. 1 shows a circuit arrangement for starting and operating a gas discharge lamp having a down converter controlled via a control device.

In FIG. 1, A and B designate input terminals for connection to an alternating voltage mains of, for example, 220 V, 50 Hz. A full-wave rectifier 1 comprising four diodes is connected to these input terminals A and B, as the case may be through a high-frequency filter (not shown), while a charging capacitor 2 is connected parallel to the output of this rectifier. Parallel to this charging capacitor 2, a down converter comprising an electronic switching element 3, for example a switching transistor, a choke coil 4, a gas discharge lamp 5 and a fly-wheel diode 6 is connected to the output of the full-wave rectifier 1. The charging capacitor 2 constitutes an input voltage source and serves inter alia to facilitate the re-ignition of the lamp 5. The choke coil 4 then constitutes an inductive element acted upon by the lamp current in the connected state of the lamp. Furthermore, a measuring resistor 7 serving as a current sensor is inserted into the lamp circuit and at this resistor is derived an actual voltage which is proportional to the instantaneous actual lamp current and which is fed to the input C of a control device 8. In known manner the control device 8 causes the lamp current to follow a nominal signal to be applied to the input D of the control device 8.

In this case, the current derived from the alternating voltage mains should vary as sinusoidally as possible. The audio-frequency signal occurring at the output E of the control device 8 switches the electronic switching element 3 into the conducting and the non-conducting state, respectively. The terminal F of the switching device 8 is connected to ground. Through the terminal G, a supply direct voltage is supplied to the control device 8.

An ignition circuit comprising a charging resistor 9, a pulse capacitor 10, a sidac switching element 11 and an ignition transformer 12 is connected parallel to the lamp 5. Through the charging resistor 9, the pulse capacitor 10 is charged to the voltage applied across the lamp 5. As soon as this voltage at the pulse capacitor 10 reaches the threshold voltage of the sidac switching element 11, this switching element becomes conductive so that the pulse capacitor 10 is discharged through the primary winding of the ignition transformer 12 and then produces in its secondary winding a voltage pulse of a few kV, which is fed to a starting electrode H of the lamp 5. After discharge of the pulse capacitor 10, the sidac switching element becomes high-ohmic again.

The d.c. supply voltage (for example +10 V) for the control device 8 and for major switching transistor 3 is produced from a tapping 13 of the choke coil 4. The audio-frequency voltage derived at the said choke coil 4 is then rectified by means of a rectifier diode 14 and is supplied via a current-limiting resistor 15 to a smoothing capacitor 16, being parallel connected for voltage limitation by a Zener diode 17 as a voltage-stabilizing element. The charging voltage of the smoothing capacitor 16 is supplied to the control device 8 through its terminals F and G as a d.c. supply voltage. The high-frequency voltage is then produced at the tapping 13, however, only when the switching transistor 3 switches already, i.e. when a d.c. supply voltage is already present. In order to obtain the latter when switching on the arrangement, a separate starting circuit is required. According to the invention, for this purpose the smoothing capacitor 16 is connected through a first ohmic resistor 18 and a first switching transistor 19 to the first terminal of the input direct voltage source 2 and is connected through the choke coil 4 and the lamp 5 ionized by the ignition circuit and through the resistor 9, the capacitor 10 and the ignition transformer 12, respectively, to the second terminal of the input direct voltage source 2. The capacitor 16 is consequently charged by the rectified mains voltage. A reliable ignition of the lamp is obtained by the additional charging current then flowing through the lamp. The first switching transistor 19, constituting the controllable semiconductor switch, is set to the conducting state by a second ohmic resistor 20 connected across the collector-base path. As soon as a sufficient voltage occurs at the smoothing capacitor 16, the control device 8 and hence the switching transistor 3 start to operate, as a result of which the said high-frequency voltage occurs at the tapping 13 of the choke coil 4 and hence the smoothing capacitor 16 is normally charged. A voltage drop is then obtained at the current-limiting resistor 15 and this voltage drop acts upon the base of a second switching transistor 21 shunting the emitter-base path of the first switching transistor 19. Thus, the second switching transistor 21 becomes conductive and hence the first switching transistor 19 is again switched to the high-ohmic state so that the additional charging current circuit for the smoothing capacitor 16, which is now no longer necessary, is interrupted.

In FIG. 1, a voltage-dependent threshold element in the form of a Zener diode 22 and a resistor 23 are connected between the current-limiting resistor 15 and the base of the switching transistor 21. Resistor 23 and capacitor 24 forms an RC combination. The Zener diode 22 ensures that the base of the second switching transistor 21 is not driven until the voltage drop at the current-limiting resistor 15 lies above the Zener voltage of the Zener diode 22, as a result of which it is ensured that a sufficient current can flow from the choke coil 4 to the smoothing capacitor 16. Due to the RC combination 23,24, it is further achieved that the additional current circuit is interrupted so as to be delayed by the time constant $R_{23}.C_{24}$ because the voltage increase at the base of the second switching transistor 21 takes place with a corresponding delay. Thus, for example, the additional current flow through the lamp 5 is maintained during the first mains half cycles succeeding the ionization of the lamp 5, which leads to an improvement of its ignition and starting behaviour.

Figure 2:
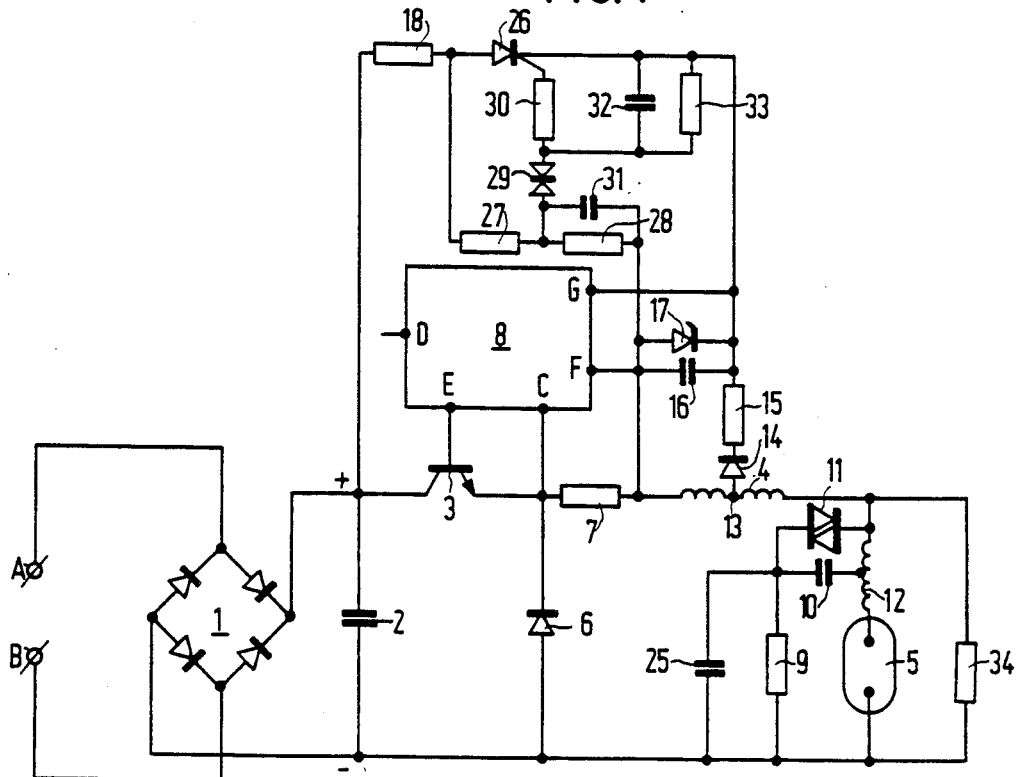
FIG. 2 shows a modified circuit arrangement of this, kind.

A disadvantage of a starting circuit comprising transistors as controllable semiconductor switches is that transistors, which can pass comparatively large additional currents (for example 1A), are expensive and require comparatively high power for their drive. On the other hand, however, such large currents are required for the reignition of still hot high-pressure lamps. For this reason, FIG. 2 shows a circuit arrangement in which inexpensive thyristors or triacs are used which can be driven with low losses, but nevertheless pass high currents. The electronic ballast unit is again the down converter circuit known from FIG. 1, in which case a superheterodyne igniter comprising an ignition transformer 12, a charging resistor 9, a sidac switching element 11 and a pulse capacitor 10 as well as a high-frequency return capacitor 25 is used for ignition of the lamp 5 (See DE -OS 3108547). The smoothing capacitor 16 is fed from the choke coil 4 in the same manner as in the circuit arrangement shown in FIG. 1.

For starting the lamp 5, the smoothing capacitor 16 is charged through the first ohmic resistor 18, a thyristor 26 (or triac) as well as the choke coil 4, the ignition transformer 12 and the lamp 5 ionized by the ignition circuit. The thyristor 26 is ignited by means of a voltage divider comprising two subresistors 27,28 and a diac 29 as a voltage-dependent threshold element, which breaks down and initiates through a limiting resistor 30 the ignition of the thyristor 26 as soon as a voltage above the breakdown voltage of the diac 29, of about 30 V is applied between its cathode and its control electrode. The voltage divider resistors 27,28 are constructed so that this always occurs when the smoothing capacitor 16 is still uncharged. When the smoothing capacitor 16 is charged however, the latter builds up a counter voltage of, for example, about 10 V, which reduces the voltage between cathode and control electrode of the thyristor 26 to such an extent that the diac 29 no longer breaks down and hence no longer causes the thyristor 26 to ignite. In order to obtain a reliable ignition of the thyristor 26, it is advantageous to connect a further capacitor 31 parallel to the subresistor 28. Furthermore, it has proved to be advantageous for suppressing interference to shunt the control electrode and the cathode of the thyristor 26 with an interference capacitor 32, to which a resistor 33 is parallel-connected.

A problem can arise in the circuit arrangement described hitherto in that no synchronization exists between the ignition of the thyristor 26 and the ionization 9 to 12 and 25. Thus, it may occur that the thyristor 26 ignites before the lamp 5 is ionized. In this case an insufficient current flows through the thyristor 26 and it passes again to the non-conducting state so that, upon subsequent ionization of the lamp 5, no current can flow. In order to avoid this, a further current path in the form of a third ohmic resistor 34 parallel to the lamp 5 has to be formed, which permits a current flow above the hold current of the thyristor 26 of, for example, a few mA. With the circuit arrangements shown and described, a reliable ignition of, for example, metal halide and sodium high-pressure lamps is possible, while especially the circuit arrangement shown in FIG. 2 is also suitable for the reignition of still hot lamps. In an embodiment for operating a 45 W metal halide lamp with a lamp operating voltage of about 100 V, the essential elements of the circuit arrangement shown in FIG. 1 had the following values:

Transistor 3: IRF 730 of International Rectifier;
transistor 19:2N6499 of Valvo;
transistor 21: BC 107 of Valvo;
Fly-wheeldiode 6: DSR 5400 of TRW;
sidac switching
element 11: K1V26 of Shindengen;
diode 14: BAV21 of Valvo;
Zener diode 17: BZV85/C10 of Valvo;
Zener diode 22: BZX79/C3V6 of Valvo;
capacitor 10: 47 nF/400 V;
capacitor 16: 22 μF/25 V;
capacitor 24: 22 μF/25 V;
capacitor 2: 1 μF/400 V;
resistor 9: 100 kΩ;
resistor 15: 1 kΩ;
resistor 18: 2.2 kΩ;
resistor 20: 68 kΩ;
resistor 23: 3.9 kΩ;
resistor 7: 1 kΩ;
choke coil 4: 1 mH.

In an embodiment for operating a 40 W sodium high-pressure lamp with a lamp operating voltage of about 50 V, the essential elements of the circuit arrangement (FIG. 2) had the following values:

Thyristor 26: BT149 or BT151 of Valvo;
diac 29: BR100 of Valvo;
capacitor 31: 22 nF/100 V;
capacitor 32: 22 nF/100 V;
capacitor 25: 47 nF/400 V;
capacitor 2: 1.5 μF/400 V;
resistor 18: 290Ω;

resistor 27: 680 kΩ;
resistor 28: 120 kΩ;
resistor 34: 25 kΩ;
resistor 30: 18Ω;
resistor 33: 470Ω.

Finally, it should be noted that in the circuit arrangement according to the invention, the electronic ballast unit need not necessarily be a down converter, but may also be in the form of a fly-back converter, a bridge or half bridge circuit or a resonance converter. Furthermore, instead of the choke tapping 13, the whole choke 4 or a secondary winding provided on the choke may be used. Instead of the rectifier diode 14, a bridge rectifier may then be used.

What is claimed is:

1. A circuit arrangement for starting and operating a gas discharge lamp with current of higher frequency comprising: an electronic ballast unit connected to terminals for an input d.c. voltage source and comprising an electronic switching element controlled by a control device and connected in series with an inductive element which is acted upon by the lamp current and from which a voltage can be derived which is fed as a d.c. supply voltage to the control device through a rectifier and a smoothing capacitor, and means connecting a first connection of the smoothing capacitor through a first ohmic resistor to a first terminal of the input direct voltage source and a second connection of the capacitor through the lamp to a second terminal of the input direct voltage source.

2. A circuit arrangement as claimed in claim 1, further comprising a voltage-stabilizing element connected parallel to the smoothing capacitor.

3. A circuit arrangement as claimed in claim 1 further comprising a controllable semiconductor switch connected in series with the first ohmic resistor and the smoothing capacitor, said controllable semiconductor switch being arranged to interrupt the current through the first ohmic resistor after the lamp has started.

4. A circuit arrangement as claimed in claim 3, characterized in that the controllable semiconductor switch comprises a first switching transistor having a collector-base path shunted by a second ohmic resistor and an emitter-base path shunted by a second switching transistor, a current-limiting resistor connected between the rectifier and the smoothing capacitor, and means connecting a base of the second switching transistor to a junction between the rectifier and the current-limiting resistor.

5. A circuit arrangement as claimed in claim 4 wherein said base connecting means includes a voltage-dependent threshold element coupled between the current-limiting resistor and the base of the second switching transistor.

6. A circuit arrangement as claimed in claim 5, wherein said base connecting means further comprises an RC combination coupled to said junction and to the base of the second switching transistor.

7. A circuit arrangement as claimed in claim 3, characterized in that the controllable semiconductor switch is a thyristor or a triac and in that a part of the series arrangement comprising the thyristor or triac and the smoothing capacitor is shunted by a voltage divider comprising two subresistors having a junction point between the two subresistors connected through a voltage-dependent threshold element to the control electrode of the thyristor or triac.

8. A circuit arrangement as claimed in claim 7, characterized in that a further capacitor is coupled between the voltage-dependent threshold element and the connection of the smoothing capacitor remote from the thyristor or triac.

9. A circuit arrangement as claimed in claim 7 further comprising an anti-interference capacitor coupled between a cathode and the control electrode the thyristor or triac.

10. A circuit arrangement as claimed in claim 1 further comprising an ignition circuit connected parallel to the lamp, said ignition circuit comprising elements permitting a flow of current when the lamp is not yet ionized.

11. A circuit arrangement as claimed in claim 7 further comprising a third ohmic resistor connected parallel to the lamp.

12. A circuit arrangement as claimed in claim 2 further comprising a controllable semiconductor switch connected in series with the first resistor and the smoothing capacitor, said controllable semiconductor switch being arranged to interrupt the current through the first resistor after the lamp has started.

13. A circuit arrangement as claimed in claim 4 further comprising an RC combination coupled to said junction and to the base of the second switching transistor.

14. A circuit arrangement as claimed in claim 1 further comprising a Zener diode connected in parallel with the smoothing capacitor.

15. A circuit for starting and operating a discharge lamp comprising:
a pair of input terminals for connection to a source of DC supply voltage,
a controlled electronic switching element,
an inductive element,
means connecting the electronic switching element and the inductive element in series to said input terminals and to the lamp so that the inductive element is acted upon by lamp current to develop a voltage and the electronic switching element controls, at least in part, the lamp current,
a control device having an output coupled to a control electrode of the electronic sWitching element to control the switching thereof at a high frequency,
a diode and a capacitor coupled to the inductive element and to a supply voltage input of the control device to derive a DC supply voltage for the control device from said voltage developed by the inductive element and in response to switching of the electronic switching element, and
circuit means coupled to said input terminals to provide a charge current path for the capacitor that includes at least a first resistor and the discharge lamp.

16. A circuit as claimed in claim 15 wherein said connecting means connects the electronic switching element, the inductive element and the lamp in a series circuit across the input terminals.

17. A circuit as claimed in claim 15 wherein said circuit means includes, in series, the first resistor, the capacitor, at least a part of the inductive element, and the lamp, said circuit means providing a charge current path for the capacitor from said input terminals that bypasses the electronic switching element.

18. A circuit as claimed in claim 15 wherein said circuit means bypasses the electronic switching element and includes, in series, the first resistor, a controllable semiconductor switch, the capacitor and the lamp, said controllable semiconductor switch being operative to interrupt current flow to the capacitor from the input terminals after the lamp is in operation.

19. A circuit as claimed in claim 15 wherein said circuit means comprises, in series, the first resistor, a controllable semiconductor switch having a thyristor characteristic, the capacitor and the lamp, said controllable semiconductor switch being operative to interrupt current flow to the capacitor from the input terminals after the lamp is in operation, and
   a voltage stabilizing element connected in parallel with said capacitor.

20. A circuit as claimed in claim 19 further comprising an impedance element connected in parallel with the lamp to provide a current path for the controllable semiconductor switch when the lamp is off.

21. A circuit as claimed in claim 15 wherein said circuit means comprises, in series, the first resistor, a controllable semiconductor switch, the capacitor, at least a part of said inductive element and the lamp, said controllable semiconductor switch being operative to interrupt current flow to the capacitor from the input terminals after the lamp is in operation,
   means for deriving a control voltage determined by lamp current and applying said control voltage to a control input of the control device which in turn influences an output switching signal appearing at said output of the control device,
   a starting circuit for the lamp coupled to the lamp and to said inductive element so as to produce high voltage ignition pulses for the lamp independent of said electronic switching element, and
   a further diode connected in circuit with the electronic switching element, the inductive element and the lamp so as to form a DC/AC converter coupling the lamp to the input terminals.

22. A circuit as claimed in claim 18, wherein said connecting means connects the electronic sWitching element, the inductive element and the lamp in a series circuit across the input terminals.

* * * * *